(12) United States Patent
Miyajima

(10) Patent No.: US 7,564,836 B2
(45) Date of Patent: Jul. 21, 2009

(54) INTERNET TELEPHONE APPARATUS, ADAPTER AND SERVER FOR INTERNET TELEPHONE COMMUNICATION, INTERNET TELEPHONE SYSTEM, AND CONTROL METHOD

(75) Inventor: Akira Miyajima, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1186 days.

(21) Appl. No.: 10/763,200

(22) Filed: Jan. 26, 2004

(65) Prior Publication Data

US 2004/0190711 A1 Sep. 30, 2004

(30) Foreign Application Priority Data

Mar. 27, 2003 (JP) ............................. 2003-088182

(51) Int. Cl.
 *H04L 12/66* (2006.01)
 *H04L 12/28* (2006.01)
 *H04L 12/56* (2006.01)
 *H04M 7/00* (2006.01)
(52) U.S. Cl. .................. 370/352; 370/401; 370/351; 370/389; 379/220.01
(58) Field of Classification Search .............. 379/900, 379/219, 220.01; 370/352, 401, 395.31, 370/389, 351; 455/466
See application file for complete search history.

(56) References Cited

U.S. PATENT DOCUMENTS

| | | | | |
|---|---|---|---|---|
| 6,298,239 B1 * | 10/2001 | Yonemoto et al. | ............ | 455/466 |
| 6,400,719 B1 * | 6/2002 | Chimura et al. | ........ | 370/395.31 |
| 6,829,232 B1 * | 12/2004 | Takeda et al. | ................ | 370/352 |
| 2001/0004361 A1 * | 6/2001 | Kobayashi | .................. | 370/401 |
| 2002/0009073 A1 * | 1/2002 | Furukawa et al. | ............ | 370/352 |
| 2007/0211698 A1 * | 9/2007 | Fuller et al. | ................. | 370/352 |

FOREIGN PATENT DOCUMENTS

JP 2002-101198 4/2002

OTHER PUBLICATIONS

English Languary Abstract of JP 2002-101198.
English Languary Abstract of JP 2002-101198, submitted on Jan. 26, 2004.

* cited by examiner

*Primary Examiner*—Thjuan K Addy
(74) *Attorney, Agent, or Firm*—Greenblum & Bernstein, P.L.C.

(57) ABSTRACT

When an operator of an Internet telephone inputs a telephone number, a server provides an IP address corresponding to the telephone number. Upon receiving the IP address and confirming a predetermined symbol in a host address portion of the IP address, the predetermined symbol is converted into a numeric value. Based on the converted IP address, a call destination is accessed. When the call destination is unavailable, the converted numeric value is incremented in order to generate another IP address. Then, the newly generated IP address is used to access another destination.

19 Claims, 10 Drawing Sheets

Fig.4(a)

group (A)management chart

| terminal | telephone NO. | IP address |
|---|---|---|
| A1 | 1001 | 192.168.1.1 |
| A2 | 1002 | 192.168.1.2 |
| A3 | 1003 | 192.168.1.3 |
| A4 | 1004 | 192.168.1.4 |
| Agrp | 1000 | 192.168.1.* | group (B)management chart

| terminal | telephone NO. | IP address |
|---|---|---|
| B1 | 2001 | 192.168.2.1 |
| B2 | 2002 | 192.168.2.2 |
| B3 | 2003 | 192.168.2.3 |
| B4 | 2004 | 192.168.2.4 |
| Bgrp | 2000 | 192.168.2.* |

Fig.4(b)

group (A)management chart

| terminal | telephone NO. | IP address |
|---|---|---|
| A1 | 1001 | 192.168.1.1 |
| A2 | 1002 | 192.168.1.2 |
| A3 | 1003 | 192.168.1.3 |
| A4 | 1004 | 192.168.1.4 |
| Agrp | 1000 | 192.168.1.0/29 | group (B)management chart

| terminal | telephone NO. | IP address |
|---|---|---|
| B1 | 2001 | 192.168.1.65 |
| B2 | 2002 | 192.168.1.66 |
| B3 | 2003 | 192.168.1.67 |
| B4 | 2004 | 192.168.1.68 |
| Bgrp | 2000 | 192.168.1.64/29 |

Fig.4(c)

group (A)management chart

| terminal | telephone NO. | IP address |
|---|---|---|
| A1 | 1001 | 192.168.1.1/29 |
| A2 | 1002 | 192.168.1.2/29 |
| A3 | 1003 | 192.168.1.3/29 |
| A4 | 1004 | 192.168.1.4/29 |
| Agrp | 1000 | 192.168.1.0/29 | group (B)management chart

| terminal | telephone NO. | IP address |
|---|---|---|
| B1 | 2001 | 192.168.1.65/29 |
| B2 | 2002 | 192.168.1.66/29 |
| B3 | 2003 | 192.168.1.67/29 |
| B4 | 2004 | 192.168.1.68/29 |
| Bgrp | 2000 | 192.168.1.64/29 | ent number within the same network group, in a case where a
INTERNET TELEPHONE APPARATUS, ADAPTER AND SERVER FOR INTERNET TELEPHONE COMMUNICATION, INTERNET TELEPHONE SYSTEM, AND CONTROL METHOD

BACKGROUND OF THE INVENTION

1. Field of the Invention

The present invention relates to an Internet telephone apparatus that realizes a telephone call via the Internet, a adapter and a server that are used for the Internet telephone communication, an Internet telephone system, and a control method for the Internet telephone apparatus.

2. Description of Related Art

A conventional network that is used by so-called Internet telephone has been configured as follows.

Taking an Internet telephone system using H.323 protocol as an example, a managing server (referred to as gatekeeper) is provided within an Internet telephone network. This gatekeeper has functions to receive a phone number of a destination to be called, from each telephone in a unified way, to convert the phone number into a corresponding IP address, and to return the phone number back to the caller telephone.

When an operator inputs the desired phone number to be called, the number is called. When the telephone receives the IP address that corresponds to the telephone number from the gatekeeper, the telephone can access, based on the IP address, a telephone of the desired destination to be connected via the gatekeeper, or directly access the telephone without involving the gatekeeper. Accordingly, the telephone call can be made available via the Internet (see Related Art 1).

In addition, a router is normally involved between a gatekeeper and each telephone. A plurality of Internet telephones are connected to such a router, configuring a group in a network. Telephones within the same group have IP addresses having a common network address. In a normal corporate office setting, telephones within the same department are configured as the same group on the network.

FIG. 9(a) illustrates a network configuration of a commonly used Internet telephone system. In the network of FIG. 9(a), router A 902 and router B 903 are connected to management server 901. Internet telephones A1-A4 are connected to router A 902, configuring group (A), while Internet telephones B1-B4 are connected to router B 903, configuring group (B).

FIGS. 9(b) and (c) illustrate management charts that register telephone numbers assigned to each Internet telephone and IP addresses corresponding to the numbers. FIG. 9(b) and (c) respectively illustrate management charts of group (A) and group (B). In this example, telephone numbers are extension numbers used in a corporate setting.

As shown in FIG. 9(b), telephone numbers 1001-1004 are respectively assigned to Internet telephones (terminals) A1-A4, thereby having IP addresses of (192. 168. 1. 1)-(192. 168. 1. 4). Thus, network address (192. 168. 1) is commonly used for the above IP addresses of group (A) terminals.

As shown in FIG. 9(c), telephone numbers 2001-2004 are respectively assigned to Internet telephones (terminals) B1-B4, thereby having IP addresses of (192. 168. 2. 1)-(192. 168. 2. 4). Thus, network address (192. 168. 2) is commonly used for the above IP addresses of group (B) terminals.

[Related Art 1]

Japanese Patent Laid Open Publication 2002-101198 (Pages 4-5, FIG. 1)

The above described conventional art has the following shortcomings.

In a case where a call is place to a telephone in a department and the telephone is busy, the caller must hang up the phone and dial another number of a telephone, which is in close proximity to the unavailable telephone, if it is for an urgent matter. Therefore, such a calling operation has been very cumbersome to the caller.

The above network configuration is further described using the example of terminal A1 placing a call to terminal B1. FIG. 10 is a sequence chart illustrating an operation of a conventional Internet telephone system.

As shown in FIG. 10, when a call is placed from terminal A1 to terminal B1, the caller first input telephone number (2001) of terminal B1. Upon receiving the telephone number input, terminal A1 requests for an IP address of terminal B1 from server 901. Then, server 901 provides the IP address of terminal B1. Based on the provided IP address, terminal A1 places a call to terminal B1.

In this example, terminal B1 is busy, thus the connection to terminal B1 is unsuccessful and terminal A1 sounds a busy tone. Upon confirming the busy tone, the caller hangs up the telephone first, and inputs telephone number (2002) of terminal B2. Similar to the situation of calling terminal B1, terminal B2 is called when terminal A1 receives an IP address of terminal B2 from server 901.

In this example, terminal B2 is also busy, thus the connection to terminal B2 is unsuccessful and terminal A1 sounds a busy tone. Upon confirming the busy tone, the caller hangs up the telephone, and inputs telephone number (2003) of terminal B3. Similar to calling terminal B1 and terminal B2, terminal B3 is called when terminal A1 receives an IP address of terminal B3 from server 901.

In this example, terminal B3 is not busy, thus the connection between terminals A1 and B3 is successful. Therefore, a message to the operator of terminal B1 is delivered to the operator of terminal B3. As described above, when one terminal in a department is busy, the operator must dial another number of an adjacent terminal.

SUMMARY OF THE INVENTION

The present invention is provided to address the above-described problems. The purpose of the invention is to provide an Internet telephone that automatically redials a different number within the same network group, in a case where a destination telephone number is busy. The prevent invention further provides a control apparatus and a network server that are used for the Internet telephone call, an Internet telephone system, and a method for the Internet telephone call.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIGS. 4(a), 4(b), and 4(c) illustrate management charts registering telephone numbers and corresponding IP addresses that are assigned to each Internet telephone and registered in a memory of the server, according to the embodiment of the present invention;

FIG. 9 (b) and (c) illustrate management charts registering telephone numbers and corresponding IP addresses that are assigned to each Internet telephone and managed by a server of the conventional Internet telephone system.

DETAILED DESCRIPTION OF PREFERRED EMBODIMENTS

The embodiments of the present invention are explained in the following, in reference to the above-described drawings.

Figure 1:
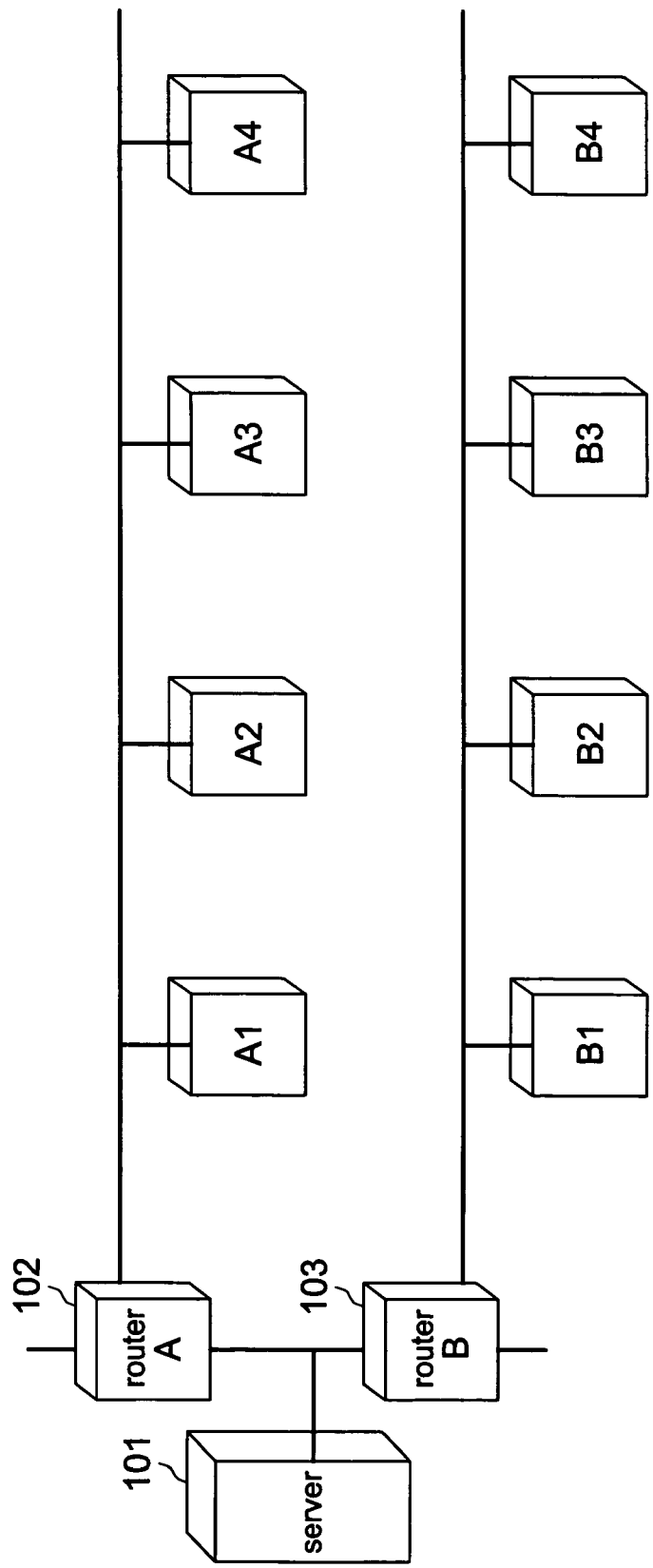
FIG. 1 illustrates a configuration of a network to which Internet telephones according to an embodiment of the present invention are connected.

FIG. 1 illustrates a configuration of a network that connects Internet telephones according to an embodiment of the present invention. In the network of FIG. 1, router A 102 and router B 103 are connected to management server (hereafter referred to as "server") 101. Internet telephones A1-A4 are connected to router A 102, configuring group (A), while Internet telephones B1-B4 are connected to router B 103, configuring group (B). Each group within the network of FIG. 1 can be considered as a department of a corporation. The exemplary setting of the Internet telephones at a department is illustrated in the figure.

Although FIG. 1 illustrates a situation where Internet telephones are connected to a router, the configuration can be made so that each ordinary telephone (without the Internet telephone functions) is connected to a control apparatus facilitating the Internet telephone functions (hereafter referred to as "control adaptor"). In the following illustrations, ordinary telephones are connected to such a control adaptor in order to function as Internet telephones.

Figure 2:
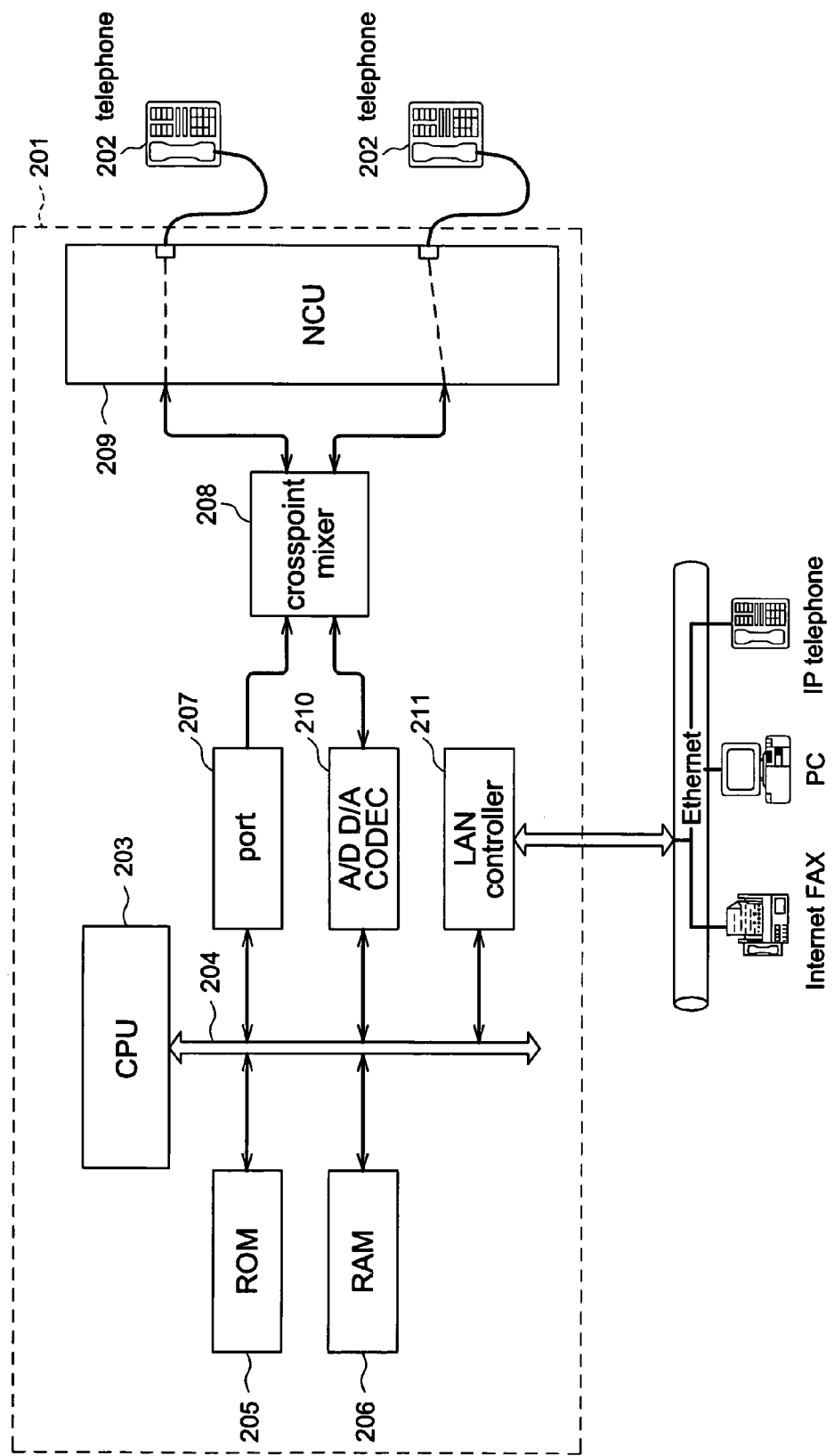
FIG. 2 is a block chart illustrating a configuration of the Internet telephones according to the embodiment of the present invention.

FIG. 2 is a block diagram illustrating the configuration of the Internet telephones according to the present embodiment of the present invention.

As shown in FIG. 2, the Internet telephone according to the present embodiment is configured to connect ordinary telephone 202 with control adaptor 201. Control adaptor 201 according to the present embodiment can connect up to two telephones 202 in order to facilitate each telephone to function as an Internet telephone. Certainly, a configuration can also be made where more than three telephones can be connected to control adaptor 201.

Control adaptor 201 is provided with CPU 203 that controls the entire control adaptor 201. ROM 205 and RAM 206 are connected to CPU 203 via control bus 204. ROM 205 stores a control program for control adaptor 201, the program being retrieved and executed by CPU 203. RAM 206 functions as a work memory when CPU 203 executes the control program. In control adaptor 201, a flash ROM is used as ROM 205, while an SDRAM is used as RAM 206.

Crosspoint mixer 208 is also connected to CPU 203 via port 207. Crosspoint mixer 208 has switching and mixing functions of talk lines for the two telephones connected via an NCU (Network Control Unit), which is later described.

NCU 209 is connected to crosspoint mixer 208. NCU 209 controls telephone lines connected to control adaptor 201, and connects/cuts a line to an opposing side.

Further, A/D D/A CODEC 210 and LAN controller 211 are connected to CPU 203 via control bus 204. A/D D/A CODEC 210 performs an analog/digital conversion of voice data, which is input from telephone 202, and conducts a compression process. A/D D/A CODEC 210 also receives the compressed data via LAN controller 211 to restore the data, and performs the analog/digital conversion.

LAN controller 211 controls signals exchanged with the Ethernet, the Ethernet configuring the network to which control adaptor 201 is connected. LAN controller 211 also assembles and analyses packet data transmitted on the network.

When an Internet telephones are used for the above configuration, instead of connecting an ordinary telephone to control adaptor 201, a control board having the function of control adaptor 201 is installed to the Internet telephones.

Figure 3:
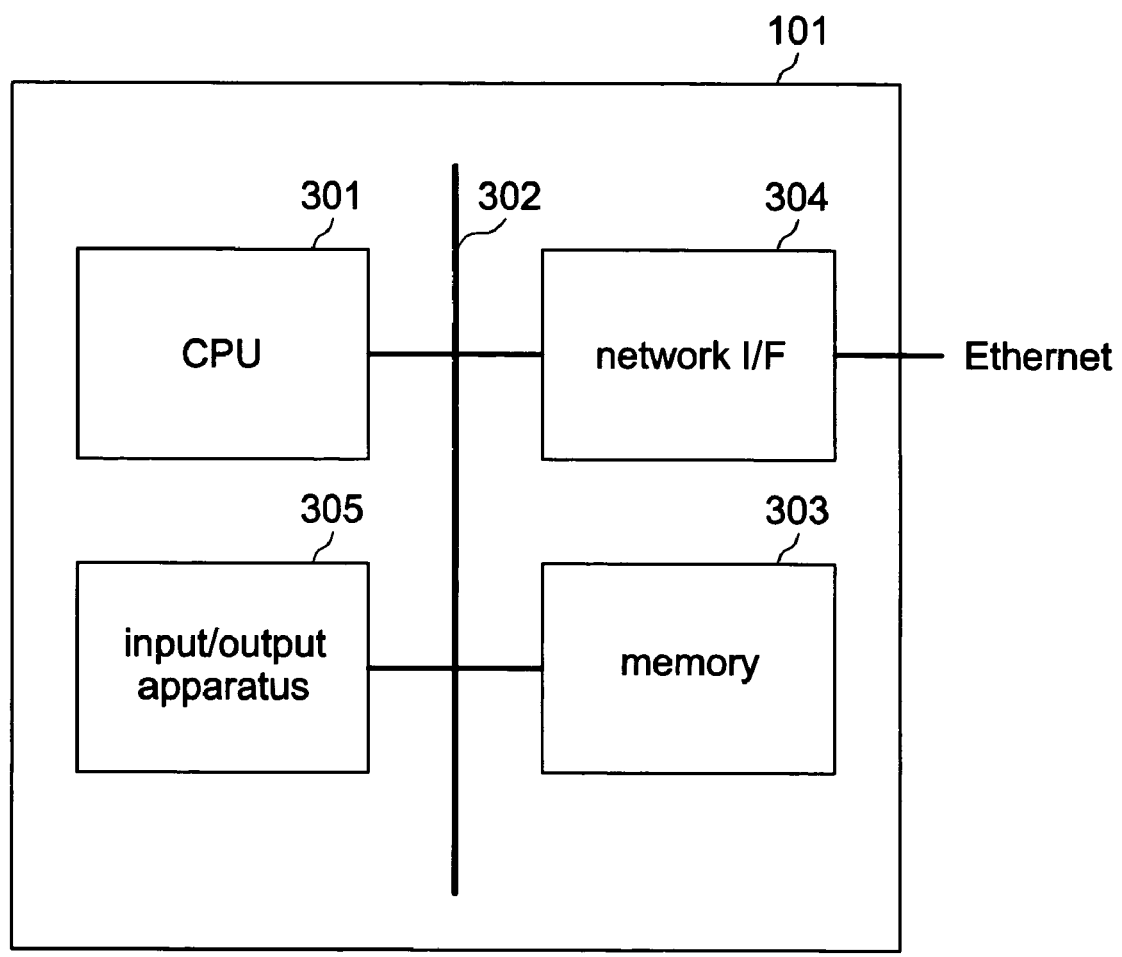
FIG. 3 is a block chart illustrating a general configuration of a server according to the embodiment of the present invention.

FIG. 3 is a block chart illustrating a general configuration of server 101 according to the embodiment of the present invention. Server 101 according to the embodiment has a function of a DNS (Domain Name System) server that provides an IP address in response to a request for a host name. Especially, in this embodiment, server 101 functions as an ENUM (Telephone Number Mapping) server that employs the ENUM technology, the technology specifying a host name with a telephone number.

As shown in FIG. 1, server 101 according to the embodiment includes CPU 301 that controls the entire server 101. Memory 303, network interface (I/F) 304, and input/output apparatus 305 are connected to CPU 301 via control bus 302.

Memory 303 includes a function of a ROM that stores a control program for server 101, the control program being retrieved and executed by CPU 301. Memory 303 also includes a function of a RAM that functions as a work memory when CPU 301 performs the control program.

Telephone numbers (extension numbers) and corresponding IP addresses of each Internet telephone (connected via the network) are registered in a region of memory 303 where memory 303 functions as a RAM. The registering method of telephone numbers and corresponding IP addresses of each Internet telephone is described later.

Network I/F 304 controls signals exchanged with the Ethernet, the Ethernet configuring the network to which server 101 is connected. Input/output apparatus 305 includes an input device such as a keyboard and mouse, and an output device such as a liquid crystal display monitor. Input/output apparatus 305 receives an input from an operator, while outputting a status of an operation at server 101.

FIG. 4 illustrates management charts registering telephone numbers and corresponding IP addresses that are assigned to each Internet telephone and registered in memory 303 of server 101, according to the embodiment of the present invention. Each management chart in FIG. 4 corresponds to the network configuration shown in FIG. 1.

According to the embodiment, the management chart registered within memory 303 of server 101 registers, in addition to telephone numbers and corresponding IP addresses assigned to each Internet telephone (terminal), a telephone number indicating a group of a plurality of Internet telephones (terminals), and the group's corresponding IP address. In particular, "Agrp" indicating group A and the group's IP address are registered as shown in FIG. 4.

The IP address corresponding to the telephone number of the group has a predetermined symbol applied to a host address portion, instead of a number. The predetermined symbol signifies that the IP address is indicating a group address.

There are a plurality of ways to apply a predetermined symbol to the host address. The configuration of the predetermined symbol to be applied to the host address is determined by the network manager, the configuration being unified on the same network. Therefore, all the groups within the same network need to have the same configuration of the predetermined symbol.

The first example uses a method of employing the first-third octets (of an IP address) for a network address, and the fourth, as a host address. Then, the fourth octet is replaced with a predetermined symbol.

FIG. 4(*a*) illustrates the above-described configuration of the management chart. As shown in the figure, memory 303 registers management charts for group (A) (hereafter referred to as "management chart A") and group (B) ("management chart B").

In management chart A, telephone numbers "1001"-"1004" are respectively registered for Internet telephones (terminals) A1-A4 of group (A). Corresponding IP addresses (192. 168. 1. 1)-(192. 168. 1. 4) are also respectively registered for the same Internet telephones. Further, in management chart A, telephone number "1000" and its corresponding IP address (192. 168. 1. *) are registered for group A "Agrp". "*" is used as a predetermined symbol in this example.

In the above illustration of this embodiment, a private address (192. 168. *. *) is used for the IP addresses. However, a global address can be applied in a similar method.

In management chart B, telephone numbers "2001"-"2004" are respectively registered for Internet telephones (terminals) B1-B4 of group (B). Corresponding IP addresses (192. 168. 2. 1)-(192. 168. 2. 4) are also respectively registered for the same Internet telephones. Further, in management chart B, telephone number "2000" and its corresponding IP address (192. 168. 2. *) are registered for group B "Bgrp".

The second method specifies a network address by employing CIDR (Classless Inter-Domain Routing), instead of octet units. The CIDR can specify the network address in a smaller unit, inserting a predetermined symbol in the octet that separates the network address portion and host address portion.

FIG. 4(*b*) illustrates the above-described configuration of the management chart. In management chart A, telephone numbers "1001"-"1004" are respectively registered for Internet telephones (terminals) A1-A4 of group (A). Corresponding IP addresses (192. 168. 1. 1)-(192. 168. 1. 4) are also respectively registered for the same Internet telephones. Further, in management chart A, telephone number "1000" and its corresponding IP address (192. 168. 1. 0/29) are registered for group A "Agrp". "/" is used as a predetermined symbol in this example.

In management chart B, telephone numbers "2001"-"2004" are respectively registered for Internet telephones (terminals) B1-B4 of group (B). Corresponding IP addresses (192. 168. 1. 65)-(192. 168. 1. 68) are also respectively registered for the same Internet telephones. Further, in management chart B, telephone number "2000" and its corresponding IP address (192. 168. 1. 64/29) are registered for group B "Bgrp".

The number (29) subsequent to predetermined symbol "/" indicates that the network address is configured with 29 bits and the host address is configured with 3 bits. 3 bits in the host address signifies that up to six Internet telephone (terminals) can be set in the group. This is because that within eight IP addresses that can be represented by 3 bits, two IP addresses are taken by the network address and broadcast address. In this embodiment, four (out of six max) Internet telephones configure both group (A) and group (B).

FIG. 4(*c*) illustrates another method of generating IP addresses. This method is different from the one of FIG. 4(*b*), in that the predetermined symbol "/" and network address portion specifying number "29" are applied, not only to IP address for "Agrp" (indicating group (A)) but also to all IP addresses of the Internet telephones that belong to group (A). Accordingly, even when a predetermined terminal is specified, a group call (later described) can be available. For example, when terminal B3 is specified as a predetermined terminal, and even when terminals B3 and B4 are unavailable, the call can be placed to terminal B1. The calling process is later described. Herein, the term "unavailable" includes, as example only, busy, no answer, and out of order, etc.

The management chart of memory 303 provided in server 101, according to the embodiment, can register IP addresses in various configurations such as the ones illustrated in FIGS. 4(*a*)-(*c*). When server 101 receives a request from an Internet telephone (connected to the network) for an IP address, server 101 provides the requested IP address of the desired destination terminal, according to how the information is registered within the management chart.

Accordingly, memory 303 of server 101 can register a predetermined symbol in place of a number in the host address portion of an IP address. Accordingly, when an Internet telephone on a network makes a request for an IP address, the server provides an IP address of a group to which a predetermined terminal is connected to, instead of the IP address of the specified terminal. Therefore, when the desired destination is unavailable, the caller (Internet telephone) can automatically place a call to another destination within the same group.

Especially, as shown in FIGS. 4(*b*) and (*c*), range information can be registered in the management chart. The range information indicates the extent to which a special symbol can be replaced with a numeric value. Accordingly, upon receiving a request for an IP address, the server provides an IP address of a group to which the predetermined terminal is connected to, instead of the IP address of the specified terminal. In addition, the range of IP addresses that is usable within the group is provided in addition to the group IP address. Accordingly, it is possible to prevent the unnecessary process where the Internet telephone accesses a non-existing IP address that does not belong to a particular group.

Figure 5:
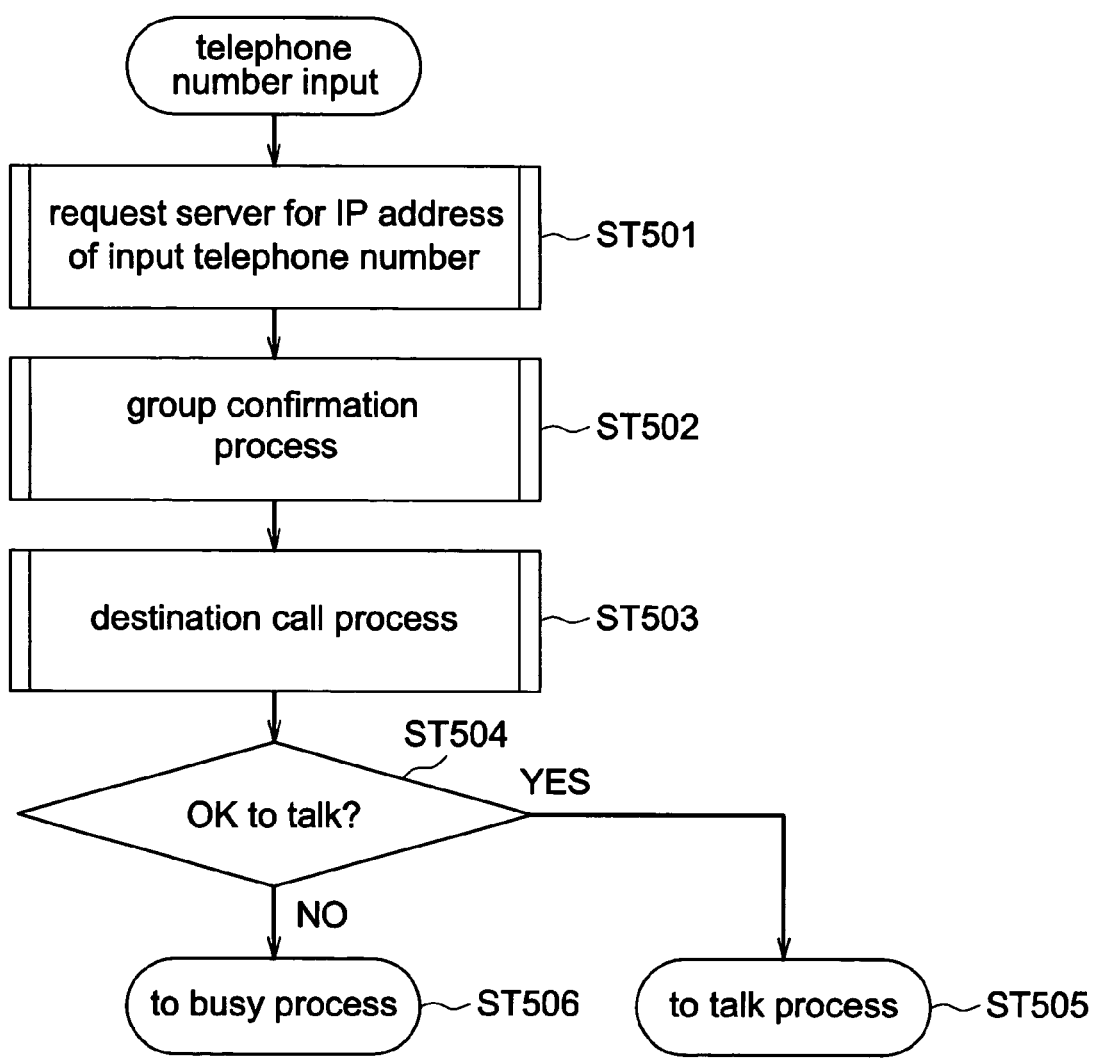
FIG. 5 is a flowchart illustrating an entire operation of the Internet telephone according to the embodiment of the present invention.
Figure 6:
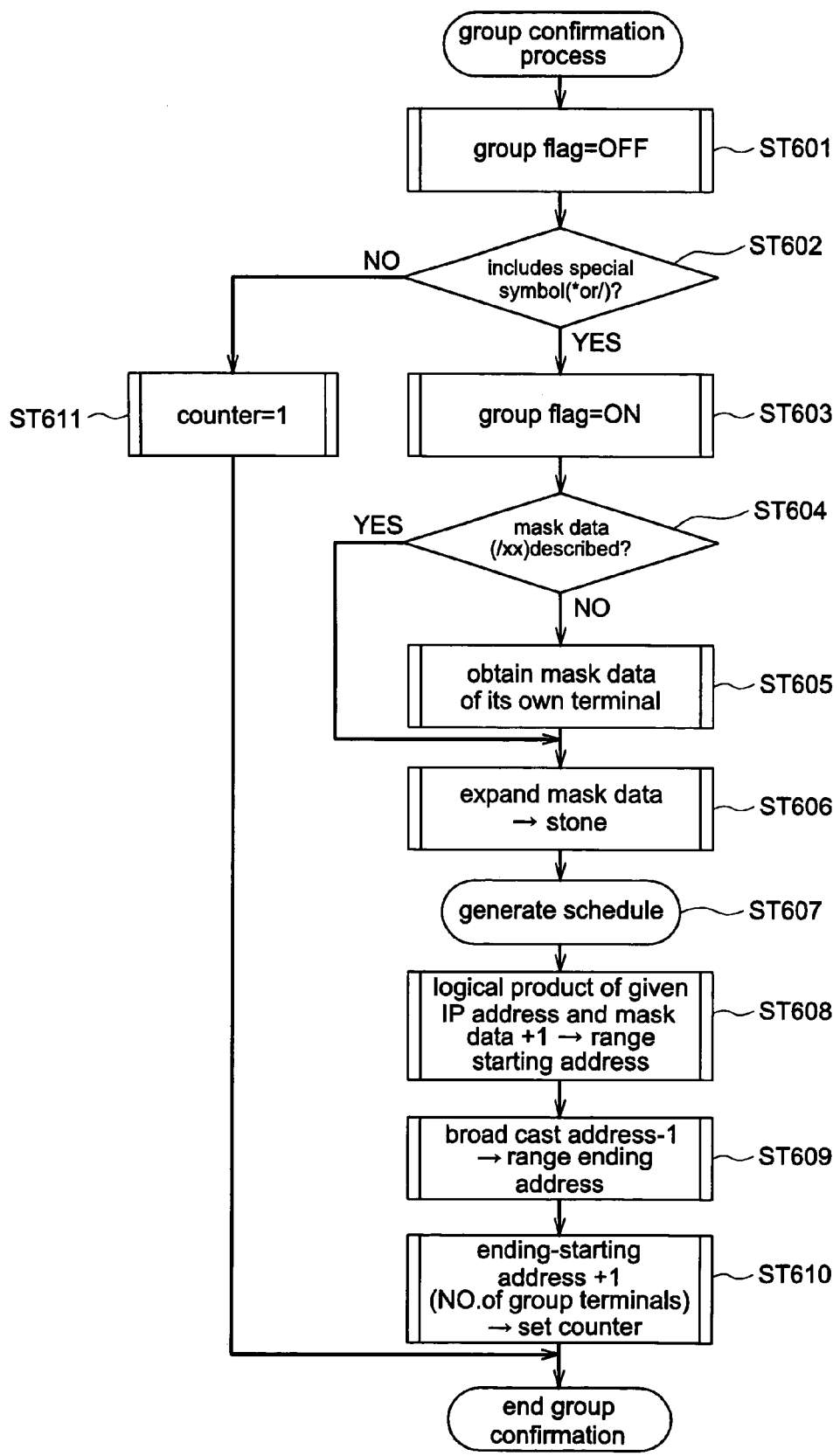
FIG. 6 is a flowchart illustrating an operation for a group confirmation process of the Internet telephone according to the embodiment of the present invention.
Figure 7:
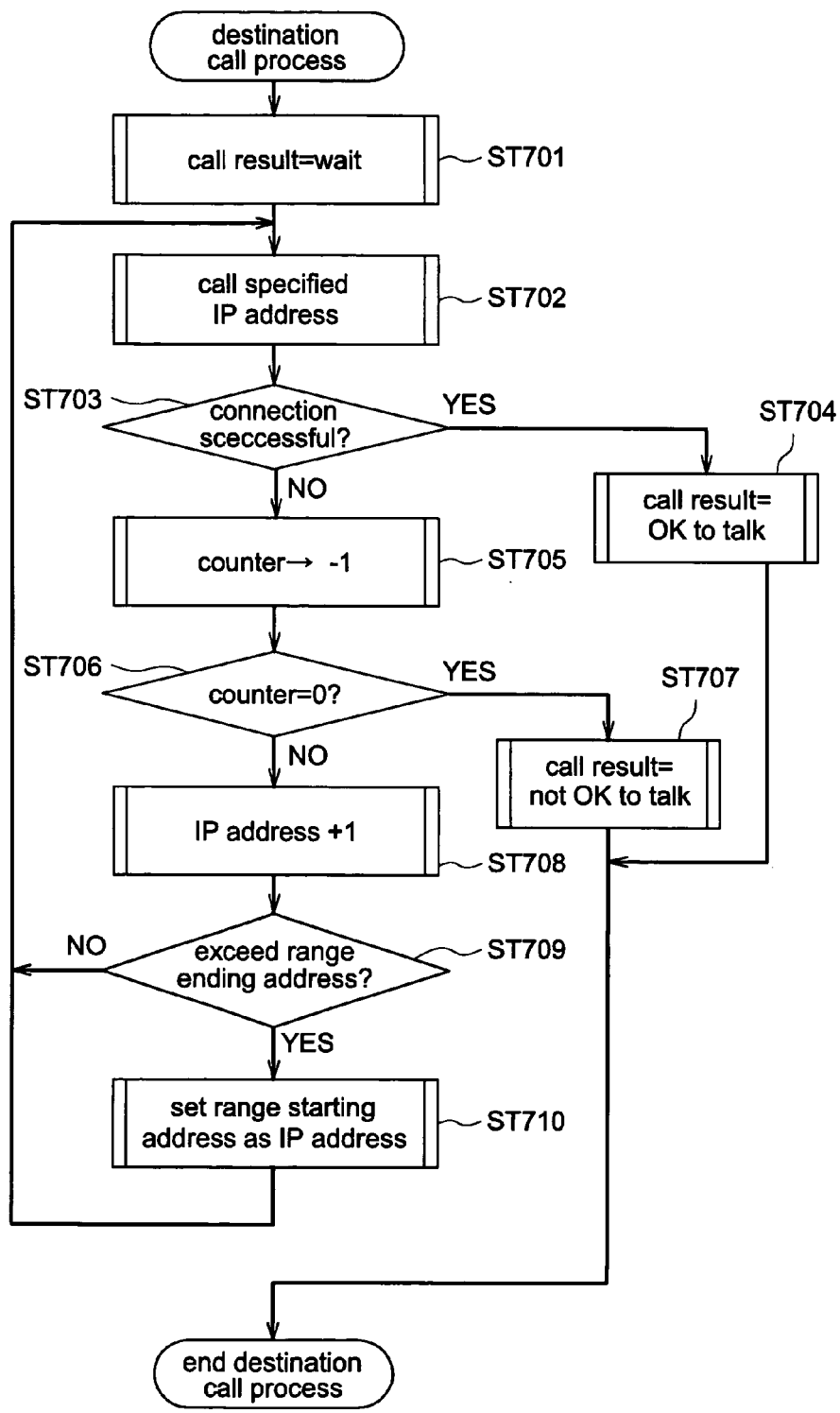
FIG. 7 is a flowchart illustrating an operation for a destination call process of the Internet telephone according to the embodiment of the present invention.

The following illustrates an operation of the Internet telephone connected to server 101, the server 101 registering the above-described management chart. FIGS. 5-7 are flowcharts illustrating the operation of the Internet telephone. In the following illustration, different configurations of IP address registration in memory 303 of server 101 are separately used as described above. In particular, the illustration uses each configuration of FIGS. 4(*a*)-(*c*).

FIG. 5 is a flowchart illustrating an entire operation of the Internet telephone according to the embodiment of the present invention. The following operation is the same no matter how the information is registered in memory 303 of server 101.

The operation is initiated when the Internet telephone receives an input of a telephone number from an operator. Upon receiving the telephone number input from the operator, the Internet telephone transmits a request to server 101 for an IP address corresponding to the telephone number, and obtains the desired IP address (ST 501).

Upon obtaining the IP address of the input telephone number, the Internet telephone performs a group confirmation process (ST 502). The group confirmation process confirms whether the destination telephone number specifies a group (group call), and when it is for a group call, how many terminals (Internet telephones) belong to the group.

After performing the group confirmation process, the Internet telephone performs a destination call process (ST 503). In the destination call process, the IP address specified by the input telephone number (hereafter referred to as "specified IP address") is called. Or, when it is determined to be a group call during the group confirmation process, the IP addresses of the Internet telephones within a particular group are called.

After performing the destination call process, the Internet telephone determines whether the result of the call (described later) is "OK to talk" (ST 504). When the result of the call is "OK to talk", a talk process is started (ST 505). When the result is not "OK to talk", a unavailable process is started (ST 506).

FIG. 6 is a flowchart illustrating the above mentioned group confirmation process. FIG. 7 is a flowchart illustrating the above mentioned destination call process. Depending on the configuration of IP addresses registered in memory 303 of server 101, the following operation of the group confirmation process is different. The following three examples follow the respective situations where IP addresses are configured as in FIG. 4(*a*) (*b*) and (*c*) (hereafter referred to as "in case of FIGS. 4(*a*)/(*b*)/(*c*)").

When the group confirmation process is initiated, the Internet telephone initializes a group flag that indicates whether the call is a group talk (ST 601). In particular, the group flag is turned off. In this embodiment, the group flag is registered in a predetermined region of RAM 206.

Next, it is determined whether the obtained IP address of the input telephone number includes a special symbol (ST 602). In this embodiment, it is determined whether "*" (as a predetermined symbol) is included in the obtained IP address. When "*" is included, it is determined that a group call is specified. When "*" is not included, it is determined that a predetermined terminal is selected for the call, instead of a group call. In this example, "*" is included.

Since "*" is included, the above described group flag is turned on (ST 603). By turning on the group flag, the call is specified to be a group call.

Then, it is determined whether the obtained IP address (of the input telephone number) includes a mask data (ST 604). To be specific, the existence of the masking data can be determined by checking whether "/" is included in the obtained IP address.

FIGS. 4(*b*) and (*c*) use "/" as a predetermined symbol within an IP address. In case of FIG. 4(*a*), "*" is used for the predetermined symbol in an IP address. Since "/" will not be detected (at ST 604), the control moves to ST 605. The example of FIG. (*b*) is used to illustrate a situation where mask data is detected.

When there is no mask data in the obtained IP address, the Internet telephone obtains mask data based on a setting of its own terminal (ST 605). In other words, when there is no mask data at ST 604, it is recognized that the IP address includes "*" as a predetermined symbol. Therefore, when "*" is included as the predetermined symbol, it is recognized that the IP address setting of the destination Internet telephone is the same. Therefore, it is further recognized that the destination Internet telephone has a network address portion in the first-third octets. Therefore, mask data having "1" in all bits of the first-third octets is obtained.

Based on the obtained mask data and IP address, mask data is expanded and stored in a predetermined region of RAM 206 (ST 606). For example, when "192. 168. 2. *" (an IP address including "*") of "Bgrp" is obtained from server 101, mask data replacing "*" with "0", i.e., "11111111. 11111111. 11111111. 00000000" is stored.

When the mask data is stored as described above, the Internet telephone starts a process to generate a schedule, including an IP address range and a number of terminals to be called for the group call (hereafter referred to as "schedule generation process") (ST 607).

In this schedule generation process, an IP address is obtained by adding "1" to a numeric value of a logical product between the obtained IP address (obtained from server 101) and mask data. In the group, the IP address having the lowest numeric value (hereafter referred to as "range starting address") is obtained (ST 608).

When the IP address of "Bgrp", (192. 168.2. *), is provided, the Internet telephone analyzes the IP address and obtains binary representation of the same, i.e., (11000000. 10101000. 00000010. ********). Then, the binary representation and its mask data (11111111. 11111111. 11111111. 00000000) are used to obtain the logical product (11000000. 10101000. 00000010. 00000000). Then, by adding "1", (11000000. 10101000. 00000010. 00000001), i.e., (192. 168. 2. 1) becomes the range starting address.

Then, an IP address is calculated by subtracting "1" from the broadcast address (recognized from the IP address provided by server 101). Within the same group, the IP address having the highest numeric value is obtained (hereafter referred to as "range ending address") (ST 609).

For example, when the IP address of "Bgrp", (192. 168. 2. *) is provided, the broadcast address recognized from this IP address (192. 168. 2. 255) is used to obtain the binary representation (11000000. 10101000. 00000010. 11111111). Then, "1" is subtracted from the binary representation in order to obtain a range ending address (11000000. 10101000. 00000010. 11111110), which is (192. 168. 2. 254).

Then, by subtracting the range starting address from the range ending address and adding "1", a number of Internet telephones (terminals) that belong to the group (hereafter referred to as "group terminal number") is obtained. Further, the group terminal number is set in the counter (hereafter referred to as "terminal counter"), which is provided in a predetermined region of RAM 206 (ST 610). The above-described range starting address and range ending address are stored in a predetermined region of RAM 206.

Using the above example, when the IP address of "Bgrp", (192. 168. 2. *) is provided, range ending address (11000000. 10101000. 00000010. 11111110) is subtracted from range starting address (11000000. 10101000. 00000010. 00000001). Then, "1" is added to the obtained value and decimalized to obtain "254", which is set in the terminal counter as the group terminal number.

When the schedule generation process is completed, the Internet telephone completes the group confirmation process.

When it is determined that "*" is not included as a predetermined symbol within the provided IP address, the Internet telephone sets "1" in the terminal counter (ST 611) and completes the group confirmation process. This is because the call is placed to a predetermined telephone number. Therefore, the number of Internet telephones to be called is set to "1", and the group confirmation process is completed.

When the group confirmation process is completed, the destination call process is started. First, the Internet telephone initializes the call result (ST 701). In particular, during the initialization, the result of whether the call result is "OK to talk" or "not OK to talk" becomes pending in a predetermined region of RAM 206.

Then, the Internet telephone places a call to the specified IP address as described above (ST 702). For example, when IP address (192. 168. 2. 1) corresponding to terminal B1 is provided, the call is placed to the IP address. When IP address (192. 168. 2. *), indicating "Bgrp", is provided by server 101, the range starting address (obtained by the schedule generation process) is called as the specified IP address.

After placing the call, the connection to the destination is checked (ST 703). When the connection is successful, the Internet telephone switches the call result to "OK to talk" (ST 704), and completes the destination call process.

When the connection is unsuccessful, the Internet telephone subtracts "1" from the terminal counter (ST 705) and checks whether the terminal counter value is "0" (ST 706). When the terminal counter value is "0", the Internet telephone switches the call result to "not OK to talk" (ST 707) and completes the destination call process.

Using the above example, when the IP address (192. 168. 2. 1) corresponding to terminal B1 is provided by server 101, numeric value "1" is registered in the terminal counter. Therefore, when the connection to terminal B1 is unsuccessful, the terminal counter is set to "0" at ST 705. Then, at ST 706, it is determined that the counter is set to "0". In this case, the call result becomes "not OK to talk" (ST 707), and the destination call process is completed.

When the IP address (192. 168. 2. *) of "Bgrp" is provided by server 101, "255" is registered in the terminal counter as described above. Therefore, even when "1" is subtracted from the terminal counter at ST 705 (because of unsuccessful connection to terminal B1), it is not determined that the terminal counter value is "0" at ST 706. In this case, the Internet telephone increments the numeric value of the specified IP by 1 (ST 708), and the incremented IP address becomes a specified IP address. Then, it is checked whether the numeric value of the newly specified IP address exceeds the range ending address (ST 709).

When the numeric value of the incremented IP address does not exceed the range ending address, the Internet telephone moves the control to ST 702 to place another call to the specified IP address. When the connection is successful, the call result is switched and the destination call process is completed. When the connection is unsuccessful, the numeric value of the specified IP address is incremented again and the process between ST 702-ST 709 is repeated.

When the numeric value of terminal counter becomes "0" during the above repeated process, it is determined that the calls to all of the Internet telephones within the specified group were unsuccessful. Therefore, the call result is switched to "not OK to talk" and the destination call process is completed.

When the IP address (192. 168. 2. *) of "Bgrp" is provided by server 101 as described above, the number of Internet telephones in group (B) is registered in the terminal counter, which is decreased by the process at ST 705. Therefore, the specified IP addresses will not exceed the range ending address even when the process from ST 702-ST 709 is repeated.

However, when the numeric value of the specified IP address exceeds the range ending address at ST 709, the destination call process includes a process that sets the range starting address as the specified IP address (ST 710). This process is executed in a situation where the IP address (registered in memory 303 of server 101) has the configuration of FIG. 4(*c*). Therefore, FIG. 4(*c*) is used as an example to illustrate the process of ST 710.

The following illustrates a group management process and destination call process using an example of FIG. 4(*b*).

In case of FIG. 4(*b*), the Internet telephone first initializes the group flag (ST 601) and checks whether the IP address (provided by the server 101) based on the input telephone number includes a predetermined symbol (ST 602). In this example, it is checked whether "/" is included as a predetermined symbol in the obtained IP address. When "/" is included, it is indicated that a group call is specified. When "/" is not included, a call needs to be placed to a predetermined telephone number, instead of a group. In this example, "/" is included. The illustration is omitted for a situation where a predetermined symbol "/" is not included, since the process is the same as in FIG. 4(*a*).

When "/" is included as a predetermined symbol, the group flag is turned on (ST 603), and it is checked whether mask data is described in the IP address (provided by server 101) based on the input telephone number (ST 604). In this example, the Internet telephone checks whether "*" or "/" is set as the predetermined symbol. In case of FIG. 4(*b*), "/" is used as a predetermined symbol in the IP address, the Internet telephone moves the control to ST 606.

At ST 606, the mask data described in the IP address is expanded and stored in a predetermined region of RAM 206. To illustrate the expanding of the mask data, the IP address (192. 168. 1. 64/29) of "Bgrp" (IP address including "/", obtained from server 101) is used as an example.

In this case, the Internet telephone recognizes that the numeric value after "/", in the IP address, indicates the mask data. In other words, it is recognized as mask data having "1" in the first 29 bits, i.e., (11111111. 11111111. 11111111. 11111000). Then, the Internet telephone stores this mask data in a predetermined region of RAM 206.

Upon storing the mask data, the Internet telephone starts a schedule generation process (ST 607). In this schedule generation process, a range starting address and a range ending address are obtained in the same method as in FIG. 4(*a*) (ST 608 and ST 609). Then, the group terminal number is calculated and set in the terminal counter (ST 610).

When server 101 provides the IP address (192. 168. 1. 64/29) of "Bgrp", the Internet telephone analyses the IP address and obtains a binary representation (11000000. 10101000. 00000010. 01000000). Then, the binary representation and its mask data (11111111. 11111111. 11111111. 11111000) are used to obtain the logical product (11000000. 10101000. 00000010. 01000000). Then, by adding "1", (11000000. 10101000. 00000001. 01000001), i.e., (192. 168. 1. 65), becomes the range starting address.

Further, "1" is subtracted from the broadcast address (11000000. 10101000. 00000001. 01000111), which is recognized from the above IP address, to obtain (11000000. 10101000. 00000001. 01000110), i.e., (192. 168. 1. 70), which becomes the range ending address. Furthermore, by subtracting the range starting address from the range ending address and adding "1", numeric value "6" is obtained and set in the terminal counter.

When the schedule generation process is completed, the Internet telephone completes the group confirmation process and starts the destination call process. In case of FIG. 4(*b*), the destination call process is performed in the same way as in the case of FIG. 4(a), the detail illustration is omitted.

For example, when the IP address (192. 168. 1. 65) corresponding to terminal B1 (specified Internet telephone) is provided by server 101, the call is placed to the specified IP address. When the IP address (192. 168. 1. 64/29) indicating "Bgrp" is provided by server 101, the range starting address is obtained (by performing the schedule generation process) and called as an specified IP address. The call continues to be placed by incrementing the IP address until the call is connected or call reaches the range ending address. When the terminal counter reaches "0" by repeating the call process, the call result is set to "not OK to talk" and the destination call process is completed.

The operation of ST 710 in the destination call process is performed when IP addresses have the configuration as in FIG. 4(c). Therefore, this operation is not performed in case of FIG. 4(b).

The following illustrates the group management process and destination call process in case of FIG. 4(c).

In case of FIG. 4(c), the Internet telephone also initializes the group flag (ST 601), and determines whether the IP address provided by server 101, based on the input telephone number, includes a predetermined symbol (ST 602). In this example, it is checked whether the provided IP address includes "/" as a predetermined symbol.

Since IP addresses of all the Internet telephones of FIG. 4(c) include the predetermined symbol "/", the process moves to ST 603, instead of ST 611, from ST 602.

When a group IP address (e.g., (192. 168. 1. 64/29) of "Bgrp") is provided by server 101, as an IP address having predetermined symbol "/" in case of FIG. 4(c), the operation is the same as in FIG. 4(b). Therefore, the illustration is omitted.

When the group flag is turned on, the Internet telephone checks whether mask data is described in the IP address (of the input telephone number) provided by server 101 (ST 604). In this example, it is checked whether "*" or "/" is set as the predetermined symbol, similar to the case of FIG. 4(b). Since "/" is included in the IP address as the predetermined symbol in case of FIG. 4(c), the Internet telephone moves the control to ST 606.

At ST 606, the mask data described in the IP address is expanded and stored in a predetermined region of RAM 206. The IP address (192. 168. 1. 67/29) of terminal B3 is used in the following illustration, as an IP address provided by server 101, having "/".

In this case, the Internet telephone recognizes (11111111. 11111111. 11111111. 11111000) as mask data, the mask data having "1" in the first 29 bits, similar to the case of FIG. 4(b). Then, the Internet telephone stores the mask data in a predetermined region of RAM 206.

Upon storing the mask data, the Internet telephone starts the schedule generation process (ST 607). In the schedule generation process, the range starting address and range ending address are obtained similar to the process of FIGS. 4(a) and (b) (ST 608 and ST 609). Then, the group terminal number is obtained and set in the terminal counter (ST 610).

When server 101 provides the IP address (192. 168. 1. 67/29) of terminal B3, the Internet telephone analyses the IP address and obtains a binary representation (11000000. 10101000. 00000010. 01000011). Then, the binary representation and its mask data (11111111. 11111111. 11111111. 11111000) are used to obtain the logical product (11000000. 10101000. 00000010. 01000000). Then, by adding "1", (11000000. 10101000. 00000001. 01000001), i.e., (192. 168. 1. 65), becomes the range starting address.

Further, "1" is subtracted from the broadcast address (11000000. 10101000. 00000001. 0100011), which is recognized from the above IP address, to obtain (11000000. 10101000. 00000001. 01000110), i.e., (192. 168. 1. 70), which becomes the range ending address. Furthermore, by subtracting the range starting address from the range ending address and adding "1", numeric value "6" is obtained and set in the terminal counter.

The obtained range starting address, range ending address, and numeric value set in the terminal counter are the same as in the case where the IP address of "Bgrp" is provided by server 101. Thus, the same numeric value is obtained whichever IP address (within the same group) is provided from server 101.

When the above schedule generation process is completed, the Internet telephone completes the group confirmation process and starts the destination call process. In the destination call process of FIG. 4(c), when an IP address of a specified Internet telephone is provided by server 101, a process different from the case of FIG. 4(b) is performed. When the group IP address (e.g., of "Bgrp") is provided by server 101, the process is the same as in the case of FIG. 4(b). Therefore, the illustration of the same is omitted.

When the destination call process is started, the Internet telephone first initializes the call result (ST 701) and places a call to the specified IP address (ST 702). This is an IP address of a specified Internet telephone terminal, provided by server 101. In this example, the IP address (192. 168. 1. 67/29) of terminal B3 is provided by server 101. At ST 702, the call is placed to the IP address of terminal B3, as the specified IP address. Since the value after "/" (in the provided IP address) indicates mask data, the Internet telephone recognizes the substantive IP address (192. 168. 1. 67).

After the call process, the Internet telephone determines whether the connection to terminal B3 is successful (ST 703). When successful, the call result is switched to "OK to talk" (ST 704), and the destination call process is completed.

When the connection is not successful, "1" is subtracted from the terminal counter value (ST 705). Then, it is determined whether the terminal counter value is "0" (ST 706). In case of FIG. 4(c), when the IP address of terminal B3 is provided, the terminal counter has a numeric value of "6" as described above. Therefore, at ST 705, the terminal counter value becomes "5". Therefore, the terminal counter value is not determined to be "0" at ST 706 at this time.

Accordingly, the currently specified IP address (192. 168. 1. 67) is incremented by "1" (ST 708) to obtain the IP address (192. 168. 1. 68) as a specified IP address. Then, it is checked whether the numeric value of the specified IP address exceeds the range ending address (ST 709).

In this example, the range ending address (192. 168. 1. 70) is obtained as described above. Therefore, the Internet telephone moves the control to ST 702 and places another call to the specified IP address (192. 168. 1. 68) (ST 702). Then, the connection is checked (ST 703).

After repeating the above-described process, the incremented IP address may exceed the range ending address at ST 709, even when the terminal counter value has not reached "0" at ST 706. In particular, this situation happens where the specified IP address of the initially called Internet telephone (terminal) is not the range starting address.

In this case, the Internet telephone sets the range starting address as the specified IP address (ST 710). Using the above example, the range starting address (IP address) (192. 168. 1. 65) is set as the specified IP address. Then, the control returns to ST 702 where another call is placed to the specified IP address.

During the above repeated process after setting the range starting address as the specified IP address, and when the terminal counter value becomes "0", the Internet telephone switches the call result to "not OK to talk" (ST 707). Then, the destination call process is completed.

Figure 8:
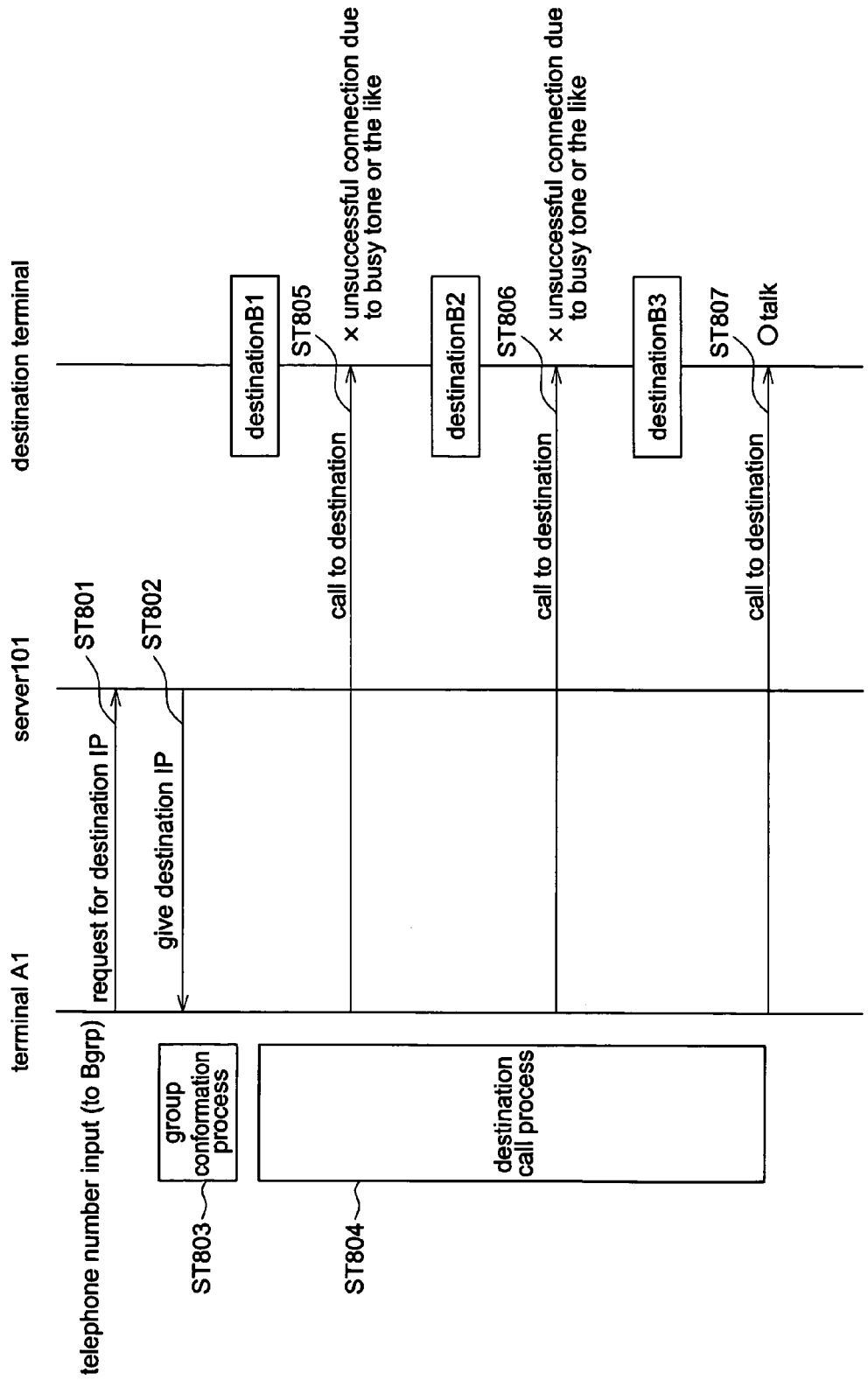
FIG. 8 is a sequence chart illustrating an operation of the Internet telephone according to the embodiment of the present invention.
Figure 9:
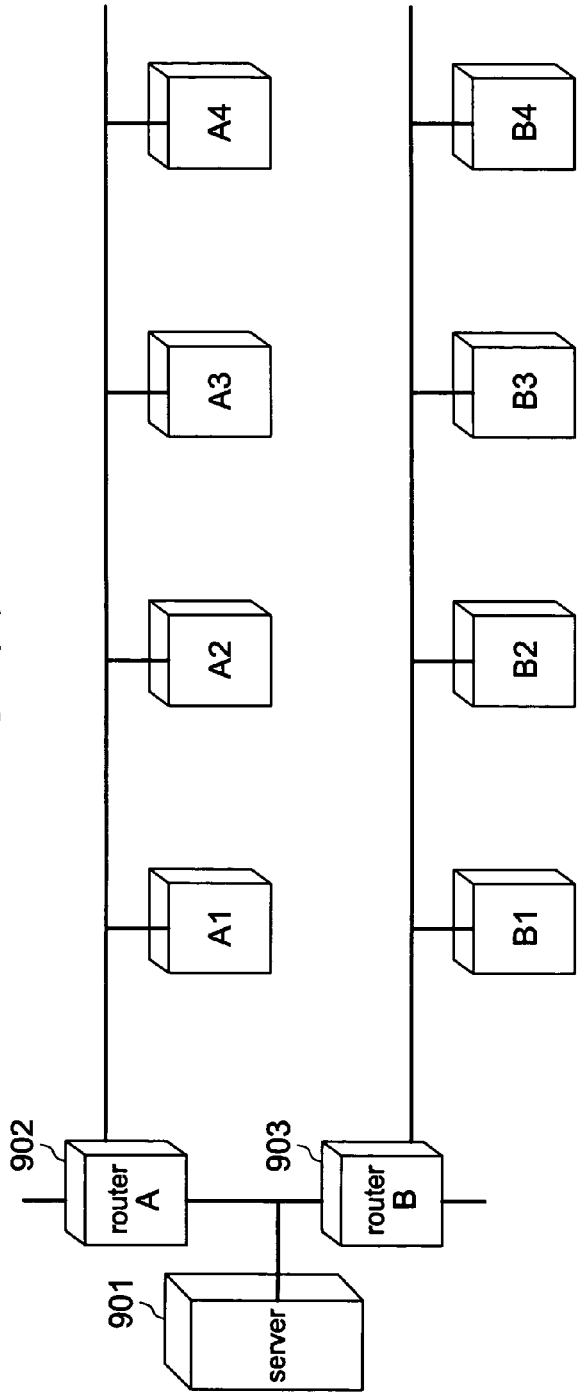
FIG. 9 (a) illustrates a network configuration of a conventional commonly used Internet telephone system.
Figure 10:
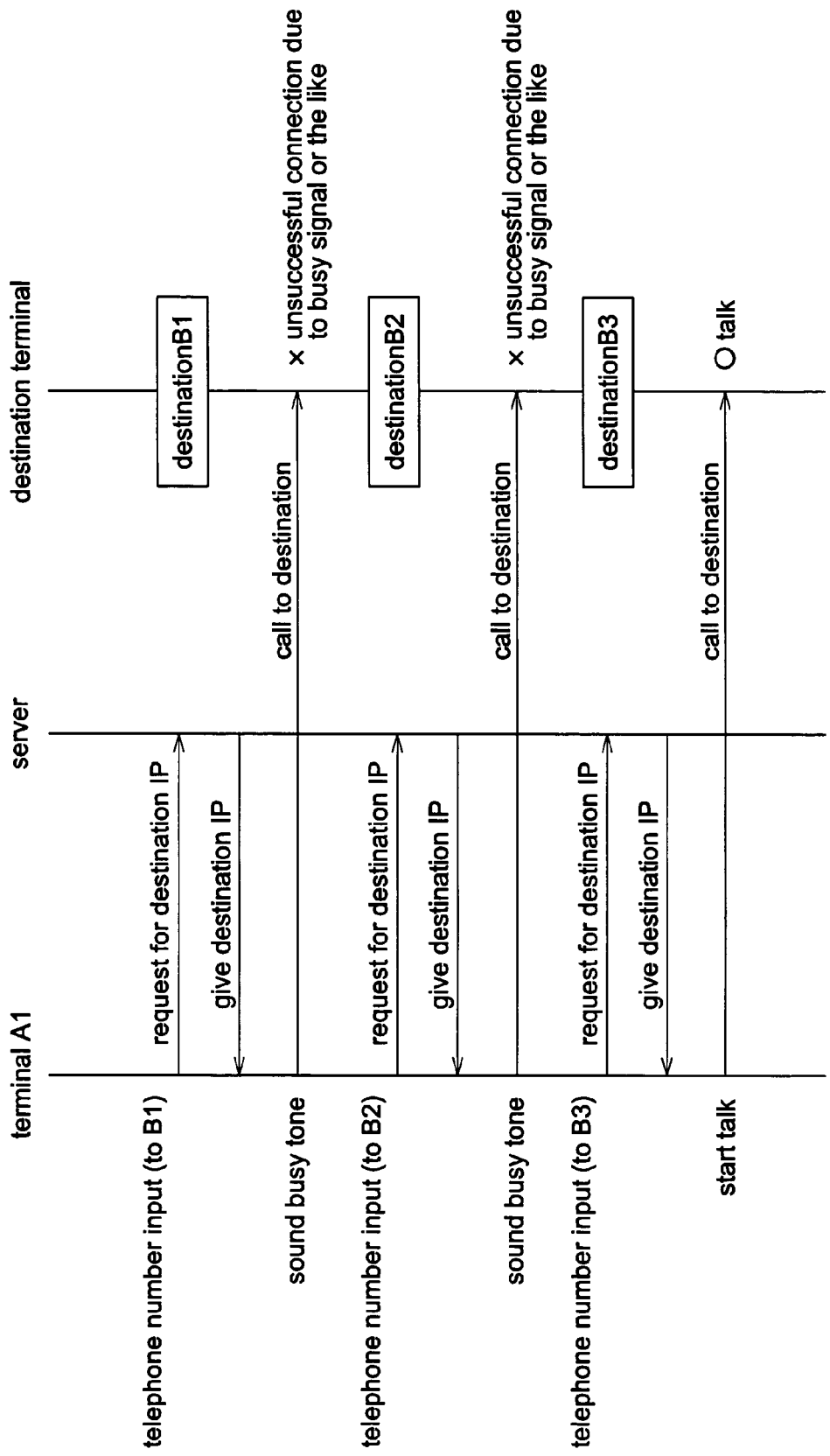
FIG. 10 is a sequence chart illustrating an operation of the conventional Internet telephone system.

The following illustrates a sequence of the above operation, performed between the Internet telephone and the destination terminal. FIG. 8 is a sequence chart illustrating the operation of the Internet telephone according to the embodiment of the present invention.

In the example given in FIG. 8, the Internet telephone is terminal A1 that is connected to group (A), and the telephone number "2000" of "Bgrp" (telephone number corresponding to group (B)) is input.

In this example, memory 303 of server 101 registers IP addresses having the configuration of FIG. 4(*a*), although memory 303 can accommodate any IP address configurations of FIGS. 4(*a*)-(*c*).

Upon receiving the input of telephone number "2000" of "Bgrp" from the operator, the Internet telephone (terminal A1) requests for the IP address corresponding to the telephone number (ST 801). Then, the server 101 provides the corresponding IP address (192. 168.2. *) to the Internet telephone (ST 802).

Upon receiving the IP address, the Internet telephone (terminal A1) performs the above-described group confirmation process (ST 803). During the group confirmation process, the range starting address, range ending address, and terminal counter value are registered in a predetermined region of RAM 206. In this example, the range starting address (192. 168.2. 1), which corresponds to terminal B1, the range ending address (192. 168. 2. 254), and the terminal counter value "254" are registered.

When the group confirmation process is completed, the Internet telephone (terminal A1) performs the destination call process (ST 804). In particular, a call is placed to terminal B1, which is specified as the range starting address (ST 805). In this example, the call is unsuccessful because terminal B1 is unavailable or the like.

Therefore, the Internet telephone (terminal A1) places a call to terminal B2, having the IP address which is incremented only by "1" from the IP address of terminal B1 (ST 806). In this example, the call is also unsuccessful because terminal B2 is unavailable or the like.

In this case, the Internet telephone (terminal A1) places a call to terminal B3, having the IP address which is incremented only by "1" from the IP address of terminal B2 (ST 807). In this example, the call is successful because terminal B3 is not unavailable or the like. Therefore, the operator of the Internet telephone (terminal A1) can talk to an operator of terminal B3.

According to the Internet telephone according to the embodiment of the present invention, when a predetermined symbol ("*" or "/") is found in the host address portion of an IP address provided by server 101, the predetermined symbol is replaced with a numeric value in the IP address. Then, the generated IP address is called. When the destination is unavailable, the replaced numeric value portion is incremented in order to place another call to another destination. Accordingly, even when a destination is unavailable, the operator can simply input one telephone number and the Internet telephone automatically places a call to another destination, thereby eliminating the need of hanging up the call and manually redialing another number within the same group, when one telephone terminal is unavailable. Therefore, the burden of calling operation is largely reduced. Especially, when a plurality of telephones are unavailable, the burden of calling operation is reduced even more.

In addition, when "/" is used as a predetermined symbol, the range of converting the predetermined number into a numeric value is indicated after "/". In this embodiment, by having "29" after "/", the range indicated by 3 bits is calculated by subtracting 29 bits from 32 bits of the IP address.

Therefore, according to the Internet telephone of the embodiment of the present invention, by indicating a range indicating the extent to which a predetermined symbol can be replaced with a numeric value, the conversion from the predetermined symbol into a numeric value is taken place within the range. When the destination terminal is unavailable, the numeric value of the IP address is incremented within the range. Thus, it is possible to prevent a situation where an IP address that does not exist in the group is accessed, exceeding the range.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

This application is based on the Japanese Patent Application No. 2003-088182 filed on Mar. 27, 2003, entire content of which is expressly incorporated by reference herein.

What is claimed is:

1. An Internet telephone apparatus connected to a server, the server storing an IP address corresponding to a telephone number of a call destination, a plurality of telephone apparatuses being associated with the call destination, the Internet telephone apparatus comprising:

a controller configured to transmit the telephone number of the call destination to the server, to receive an IP address corresponding to the telephone number of the call destination from the server, and to access the call destination for a call over the Internet based on the IP address;

said controller, when a predetermined symbol is detected in the IP address, converts the predetermined symbol into a numeric value, and accesses a predetermined one of the plurality of telephone apparatuses associated with the call destination based on the IP address including the numeric value;

and said controller, when the predetermined telephone apparatus of the call destination is unavailable, reconverts the predetermined symbol into another numeric value, and accesses another telephone apparatus of the plurality of telephone apparatuses based on the IP address including the another numeric value without user intervention at the Internet telephone apparatus.

2. The Internet telephone apparatus according to claim 1, wherein the predetermined symbol is included in a host address of the IP address.

3. The Internet telephone apparatus according to claim 2, wherein the host address is a fifth octet of the IP address.

4. The Internet telephone apparatus according to claim 1, wherein the controller receives the IP address including the predetermined symbol from the server, when the controller transmits, to the server, a telephone number indicating all of the telephone apparatuses associated with the call destination.

5. An Internet telephone apparatus connected to a server, the server storing an IP address corresponding to a telephone number of a call destination, a plurality of telephone apparatuses being associated with the call destination, the Internet telephone apparatus comprising:
   a controller configured to transmit the telephone number of the call destination to the server, to receive an IP address corresponding to the call destination from the server, and to access the call destination for a call over the Internet based on the IP address;
   said controller, when a predetermined symbol and range information are detected in the IP address, converts the predetermined symbol into a numeric value, and accesses a predetermined one of the plurality of telephone apparatuses associated with the call destination based on the IP address including the numeric value, the range information indicating a range of numeric values into which the predetermined symbol can be converted; and
   said controller, when the predetermined telephone apparatus of the call destination is unavailable, reconverts the predetermined symbol into another numeric value within the range, and accesses another telephone apparatus of the plurality of telephone apparatuses based on the IP address including the another numeric value without user intervention at the Internet telephone apparatus.

6. The Internet telephone apparatus according to claim 5, wherein the predetermined symbol is included in a host address of the IP address.

7. The Internet telephone apparatus according to claim 5, wherein the controller receives, from the server, the IP address including the predetermined symbol and the range information, when the controller transmits, to the server, a telephone number indicating that the Internet telephone apparatus automatically and sequentially accesses the plurality of telephone apparatuses associated with the call destination.

8. The Internet telephone apparatus according to claim 5, wherein the controller receives, from the server, the IP address including the predetermined symbol and the range information, when the controller transmits, to the server, a telephone number indicating all of the telephone apparatuses associated with the call destination.

9. The Internet telephone apparatus according to claim 8, wherein the controller first accesses a telephone apparatus associated with the call destination based on a starting IP address of the range; said controller, when the accessed telephone apparatus is unavailable, sequentially accesses a next telephone apparatus associated with the call destination until reaching a telephone apparatus corresponding to the last IP address of the range.

10. The Internet telephone apparatus according to claim 5, wherein the controller receives, from the server, the IP address including the predetermined symbol and the range information, when the controller transmits, to the server, a telephone number indicating a telephone apparatuses associated with the call destination.

11. The Internet telephone apparatus according to claim 10, wherein the controller first accesses a telephone apparatus of the recipient based on an IP address corresponding to the telephone number which the Internet telephone apparatus indicates;
   said controller, when the first accessed telephone apparatus is unavailable, searches for an available telephone apparatus by sequentially accessing a next telephone apparatus associated with the call destination until a telephone apparatus corresponding to the last IP address of the range is reached;
   said controller accesses a telephone apparatus corresponding to the starting IP address of the range after accessing the last IP address of the range and the last IP address of the range is unavailable; and
   said controller, when the telephone apparatus corresponding to the starting IP address is unavailable, searches for an available telephone apparatus by sequentially accessing a next telephone apparatus until the telephone apparatus immediately before the first accessed telephone apparatus is reached.

12. A adapter for an Internet telephone, connected to an telephone apparatus and to a server, the server storing an IP address corresponding to a telephone number of a call destination, a plurality of telephone apparatuses being associated with the call destination, the adapter comprising:
   a connector configured to connect to the Internet telephone apparatus;
   a controller configured to receive the telephone number of the call destination from the telephone apparatus, to transmit the telephone number of the call destination to the server, to receive the IP address corresponding to the telephone number from the server, and to access the call destination for a call over the Internet based on the IP address;
   said controller, when a predetermined symbol is detected in the IP address, converts the predetermined symbol into a numeric value, and accesses a predetermined one of the plurality of telephone apparatuses associated with the call destination based on the IP address including the numeric value; and
   said controller, when the predetermined telephone apparatus of the call destination is unavailable, reconverts the predetermined symbol into another numeric value, and accesses another telephone apparatus of the plurality of telephone apparatuses based on the IP address including the another numeric value without user intervention at the calling telephone apparatus.

13. An adapter for a Internet telephone, connected to an telephone apparatus and to a server, the server storing an IP address corresponding to a telephone number of a call destination, a plurality of telephone apparatuses being associated with the call destination, the adapter comprising:
   a connector configured to connect to the Internet telephone apparatus; a controller configured to receive the telephone number of the call destination from the telephone apparatus, to transmit the telephone number of the call destination to the server, to receive the IP address corresponding to the telephone number from the server, and to access a telephone apparatus of the call destination for a call over the Internet based on the IP address;
   said controller, when a predetermined symbol and range information are detected in the IP address, converts the predetermined symbol into a numeric value, and accesses a predetermined one of the plurality of telephone apparatuses associated with the call destination based on the IP address including the numeric value, the range information indicating a range of numeric values into which the predetermined symbol can be converted; and said controller, when the predetermined telephone apparatus of the call destination is unavailable, reconverts the predetermined symbol into another numeric value within the range, and accesses another telephone apparatus of the plurality of the telephone apparatuses based on the IP address including the another numeric value without user intervention at the calling telephone apparatus.

14. A server for an Internet telephone communication, comprising:

an interface configured to connect to an calling telephone apparatus and to a telephone apparatus of a call destination, a plurality of telephone apparatuses being associated with the call destination; a memory configured to store an IP address corresponding to a telephone number of the call destination;

a controller configured to receive the telephone number of the call destination from the calling telephone apparatus, to search the memory for the IP address corresponding to the telephone number of the call destination, and to transmit the IP address to the calling telephone apparatus; and said controller inserts a predetermined symbol into the IP address, the predetermined symbol instructing the calling telephone apparatus to automatically access another telephone apparatus associated with the call destination without user intervention at the calling telephone apparatus when a predetermined telephone apparatus corresponding to the telephone number of the call destination is unavailable.

15. A server for an Internet telephone communication, comprising:

an interface configured to connect to an calling telephone apparatus and to a telephone apparatus of a call destination, a plurality of telephone apparatuses being associated with the call destination;

a memory configured to store an IP address corresponding to a telephone number of the call destination;

a controller configured to receive the telephone number of the call destination from the calling telephone apparatus, to search the memory for the IP address corresponding to the telephone number, and to transmit the IP address to the calling telephone apparatus; and said controller inserts a predetermined symbol and range information into the IP address, the predetermined symbol instructing the calling telephone apparatus to automatically access another telephone apparatus associated with the call destination without user intervention at the calling telephone apparatus when a predetermined telephone apparatus corresponding to the telephone number of the call destination is unavailable, and the range information indicating a range of telephone apparatuses of the call destination which the calling telephone apparatus automatically accesses when the predetermined telephone apparatus corresponding to the telephone number of the call destination is unavailable.

16. An Internet telephone system having a calling telephone apparatus, a server, and a telephone apparatus of a call destination, the Internet telephone systems comprising:

the server configured to store an IP address corresponding to the called telephone number of the call destination, a plurality of telephone apparatuses being associated with the call destination;

the calling telephone apparatus configured to transmit the telephone number of the call destination to the server, to receive the IP address corresponding to the telephone number from the server, and to access the called telephone apparatus of the call destination based on the IP address;

said calling telephone apparatus, when a predetermined symbol is detected in the IP address, converts the predetermined symbol into a numeric value, and accesses a predetermined one of the plurality of telephone apparatuses associated with the call destination over the Internet based on the IP address including the numeric value; and said calling telephone apparatus, when the predetermined telephone apparatus of the call destination is unavailable, reconverts the predetermined symbol into another numeric value, and access another telephone apparatus of the plurality of the telephone apparatuses based on the IP address including the another numeric value without user intervention at the Internet telephone apparatus.

17. An Internet telephone system having a calling telephone apparatus, a server, and a telephone apparatus of a call destination, the Internet telephone system, comprising:

the server configured to store an IP address corresponding to the telephone number of the call destination, a plurality of telephone apparatuses being associated with the call destination;

the calling telephone apparatus configured to transmit the telephone number of the call destination to the server, to receive the IP address corresponding to the telephone number from the server, and to access the telephone apparatus of the call destination over the Internet based on the IP address;

said calling telephone apparatus, when a predetermined symbol and range information are detected in the IP address, converts the predetermined symbol into a numeric value, and accesses a predetermined one of the plurality of telephone apparatuses associated with the call destination based on the IP address including the numeric value, the range information indicating a range of numeric values into which the predetermined symbol can be converted; and said calling telephone apparatus, when the predetermined telephone apparatus of the call destination is unavailable, reconverts the predetermined symbol into another numeric value within the range, and accesses another telephone apparatus of the plurality of telephone apparatuses based on the IP address including the another numeric value without user intervention at the Internet telephone apparatus.

18. A control method for controlling an Internet telephone apparatus, the Internet telephone apparatus connected to a server, the server storing an IP address corresponding to a telephone number of a call destination, a plurality of telephone apparatuses being associated with a call destination, the control method comprising:

transmitting the telephone number of the call destination to the server;

receiving the IP address corresponding to the telephone number from the server;

detecting a predetermined symbol in the IP address;

converting the predetermined symbol into a numeric value when the predetermined symbol is detected in the IP address;

accessing a predetermined one of the plurality of telephone apparatuses associated with the call destination over the Internet based on the IP address including the numeric value;

reconverting the predetermined symbol into another numeric value when the predetermined telephone apparatus of the recipient is unavailable; and accessing another telephone apparatus of the plurality of telephone apparatuses based on the IP address including the another numeric value without user intervention at the Internet telephone apparatus.

19. A control method for controlling an Internet telephone apparatus, the Internet telephone apparatus connected to a server, the server storing an IP address corresponding to a telephone number of a call destination, a plurality of telephone apparatuses being associated with a call destination, the control method comprising:

transmitting the telephone number of the call destination to the server;

receiving the IP address corresponding to the telephone number from the server;

detecting the predetermined symbol in the IP address;

converting a predetermined symbol into a numeric value when the predetermined symbol and range information are detected in the IP address, the range information indicating a range of numeric value into which the predetermined symbol can be converted;

accessing a predetermined one of the plurality of telephone apparatuses associated with the call destination over the Internet based on the IP address including the numeric value;

reconverting the predetermined symbol into another numeric value within the range when the predetermined telephone apparatus of the call destination is unavailable; and accessing another telephone apparatus of the plurality of telephone apparatuses based on the IP address including the another numeric value without user intervention at the Internet telephone apparatus.

* * * * *